US010815156B2

(12) United States Patent
Schmidt et al.

(10) Patent No.: US 10,815,156 B2
(45) Date of Patent: Oct. 27, 2020

(54) CONTROLLING MICROSTRUCTURE OF INORGANIC MATERIAL BY INDIRECT HEATING USING MAGNETIC RADIATION

(71) Applicant: United Technologies Corporation, Hartford, CT (US)

(72) Inventors: Wayde R. Schmidt, Pomfret Center, CT (US); Paul Sheedy, Bolton, CA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 731 days.

(21) Appl. No.: 15/027,726

(22) PCT Filed: Sep. 24, 2014

(86) PCT No.: PCT/US2014/057096
§ 371 (c)(1),
(2) Date: Apr. 7, 2016

(87) PCT Pub. No.: WO2015/053938
PCT Pub. Date: Apr. 16, 2015

(65) Prior Publication Data
US 2016/0236990 A1 Aug. 18, 2016

Related U.S. Application Data
(60) Provisional application No. 61/889,209, filed on Oct. 10, 2013.

(51) Int. Cl.
*C04B 35/628* (2006.01)
*C04B 35/5831* (2006.01)
(52) U.S. Cl.
CPC .... *C04B 35/62894* (2013.01); *C04B 35/5831* (2013.01); *C04B 35/62863* (2013.01);
(Continued)

(58) Field of Classification Search
CPC .......... C04B 35/62894; C04B 35/5831; C04B 35/62873; C04B 35/62892;
(Continued)

(56) References Cited

U.S. PATENT DOCUMENTS 5,188,757 A * 2/1993 Paine, Jr. ............... C04B 41/87
252/183.11
5,321,223 A 6/1994 Kimrey, Jr. et al.
(Continued)

FOREIGN PATENT DOCUMENTS

EP 2343398 7/2011
WO 2002100798 12/2002

OTHER PUBLICATIONS

HI-NICALON product description (Year: 2006).*
(Continued)

*Primary Examiner* — Robert J Grun
(74) *Attorney, Agent, or Firm* — Carlson, Gaskey & Olds, P.C.

(57) ABSTRACT

Disclosed is a method for controlling a microstructure of an inorganic material includes providing a structure that has a first region of an inorganic material having a first microstructure and a second region that is thermally responsive to electromagnetic radiation, the second region being adjacent the first region, and indirectly heating the first region by thermally activating the second region, using electromagnetic radiation, to generate heat. The generated heat converts the first microstructure of the inorganic material to a second, different microstructure. The method can be applied to control a microstructure of an inorganic coating on an inorganic fiber.

10 Claims, 1 Drawing Sheet

(52) U.S. Cl.
CPC .. *C04B 35/62868* (2013.01); *C04B 35/62873* (2013.01); *C04B 35/62892* (2013.01); *C04B 2235/422* (2013.01); *C04B 2235/5244* (2013.01); *C04B 2235/662* (2013.01); *C04B 2235/667* (2013.01); *C04B 2235/76* (2013.01); *C04B 2235/80* (2013.01)

(58) Field of Classification Search
CPC ........ C04B 35/62868; C04B 35/62863; C04B 2235/80; C04B 2235/76; C04B 2235/662; C04B 2235/422; C04B 2235/5244; C04B 2235/667
See application file for complete search history.

(56) References Cited

U.S. PATENT DOCUMENTS

| | | |
|---|---|---|
| 5,848,348 A | 12/1998 | Dennis |
| 6,293,986 B1 | 9/2001 | Rodiger et al. |
| 6,805,835 B2 | 10/2004 | Roy et al. |
| 7,306,828 B2 | 12/2007 | Barrera et al. |
| 2002/0006858 A1* | 1/2002 | Timmons .............. C04B 35/593 501/87 |
| 2003/0102071 A1 | 6/2003 | Mako |
| 2005/0008875 A1 | 1/2005 | Taketomi et al. |
| 2007/0138706 A1 | 6/2007 | Metzger |
| 2009/0274850 A1 | 11/2009 | Bhatia |
| 2010/0215869 A1 | 8/2010 | Jensen et al. |
| 2011/0171399 A1* | 7/2011 | Brun ................. C04B 35/62868 427/543 |
| 2011/0256386 A1 | 10/2011 | Shi et al. |

OTHER PUBLICATIONS

The International Preliminary Report on Patentability for PCT Application No. PCT/US2014/057096, dated Apr. 21, 2016.
Extended European Search Report for European Patent Application No. 14852828.4, completed May 17, 2017.
Mascotto, Simone et al.;Effect of Microwave Assisted and Conventional Thermal Heating on the Evolution of Nanostructured Inorganic-Organic Hybrid Materials to Binary;J. Mater Chem.;Aug. 30, 2007;vol. 17;pp. 1387-4399.
Reeja-Jayan, B. et al.;Microwave-assisted Low-temperature Growth of Thin Films in Solution;Scientific Reports; Dec. 19, 2012;vol. 2, No. 1003;pp. 1-8.
International Search Report and Written Opinion for PCT Application No. PCT/US2014/057096, dated Jan. 16, 2015.

* cited by examiner

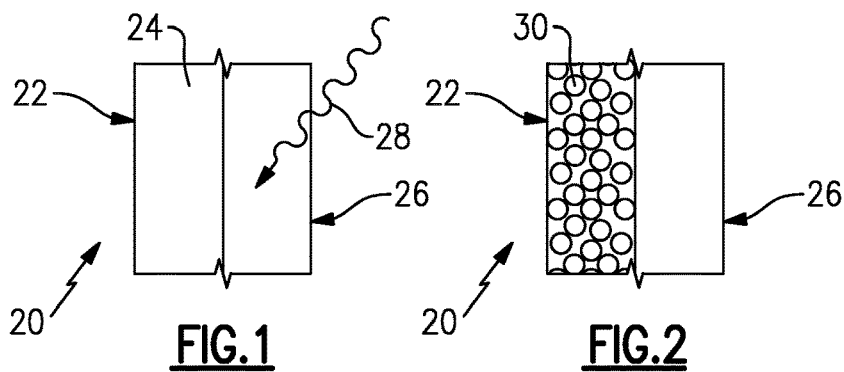
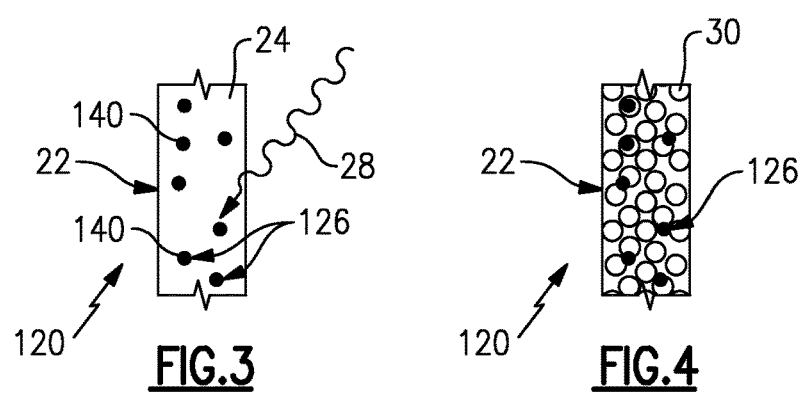
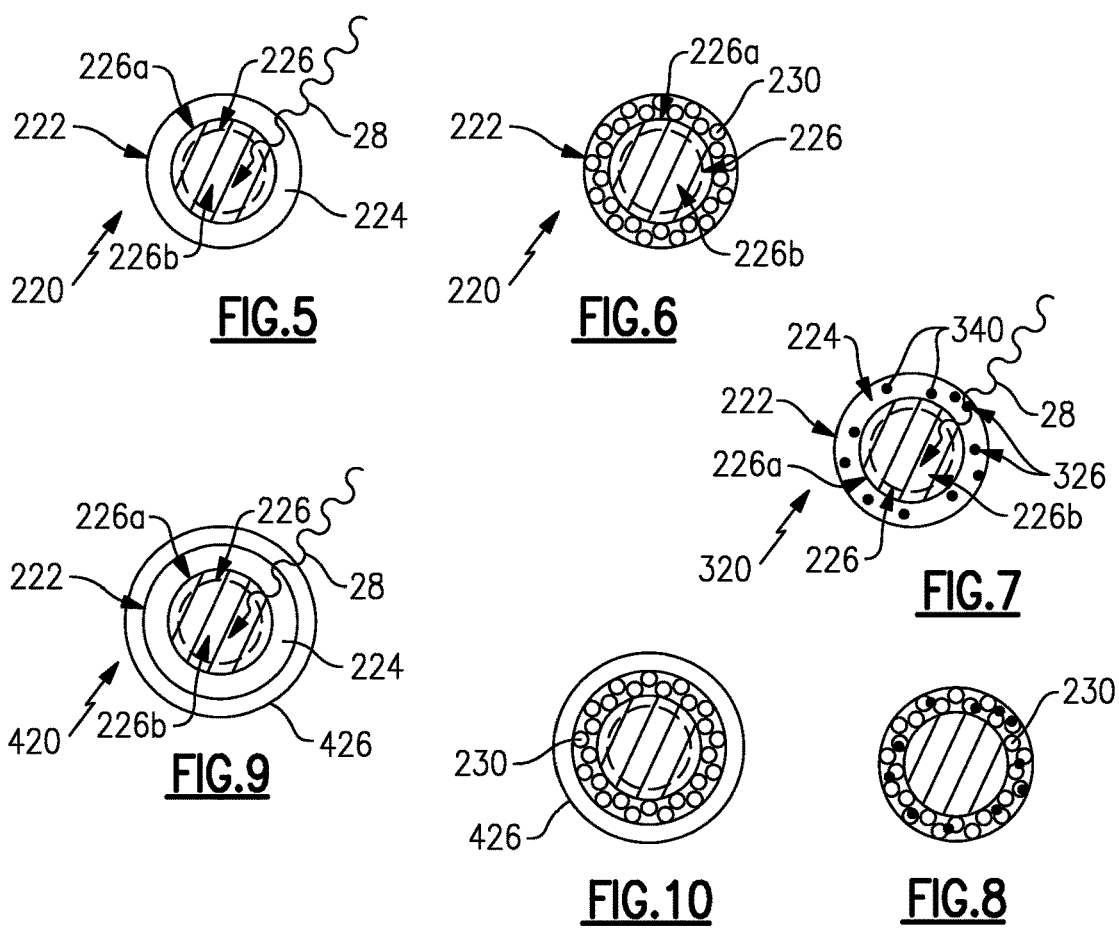

CONTROLLING MICROSTRUCTURE OF INORGANIC MATERIAL BY INDIRECT HEATING USING MAGNETIC RADIATION

CROSS-REFERENCE TO RELATED APPLICATION

This application claims priority to U.S. Provisional Application No. 61/889,209, filed Oct. 10, 2013.

BACKGROUND

This disclosure relates to inorganic materials. Inorganic materials are known and used in articles that are subject to relatively severe operating conditions, such as gas turbine engine components. Inorganic materials can be fabricated using one of various known processing techniques. One technique is polymer infiltration and pyrolysis ("PIP"), in which a preceramic polymer is infiltrated into a porous structure and then thermally converted to an inorganic phase. Pyrolysis involves the thermal conversion of a preceramic polymer to an inorganic char in a controlled atmosphere, such as argon.

SUMMARY

A method for controlling a microstructure of an inorganic material according to an example of the present disclosure includes providing a structure that has a first region of an inorganic material having a first microstructure and a second region that is thermally responsive to electromagnetic radiation. The second region is adjacent the first region and indirectly heats the first region by thermally activating the second region, using electromagnetic radiation, to generate heat. The generated heat converts the first microstructure of the inorganic material to a second, different microstructure.

In a further embodiment of any of the foregoing embodiments, the first microstructure is an amorphous microstructure and the second microstructure is a crystalline microstructure.

In a further embodiment of any of the foregoing embodiments, the conversion of the first microstructure to the second microstructure increases a percent crystallinity of the ceramic material.

In a further embodiment of any of the foregoing embodiments, the inorganic material is boron nitride.

In a further embodiment of any of the foregoing embodiments, the second region includes silicon carbide.

In a further embodiment of any of the foregoing embodiments, the inorganic material is boron nitride and the second region includes silicon carbide.

In a further embodiment of any of the foregoing embodiments, the second region includes free carbon.

In a further embodiment of any of the foregoing embodiments, the second region is within the first region.

In a further embodiment of any of the foregoing embodiments, the electromagnetic radiation is microwave radiation.

A method for controlling a microstructure of an inorganic coating on an inorganic fiber according to an example of the present disclosure includes providing a fiber structure including at least one inorganic fiber having a coating thereon. The coating includes an inorganic material that has a first microstructure. The inorganic material is indirectly heated, using electromagnetic radiation, to convert the first microstructure to a second, different microstructure.

A further embodiment of any of the foregoing embodiments includes using the electromagnetic radiation to heat at least one region adjacent the inorganic material, the at least one region being thermally responsive to the electromagnetic radiation.

In a further embodiment of any of the foregoing embodiments, the at least one region is a surface region of the at least one inorganic fiber.

In a further embodiment of any of the foregoing embodiments, the at least one region is another coating on the coating.

In a further embodiment of any of the foregoing embodiments, the at least one region includes a plurality of regions of particles dispersed within the inorganic material.

In a further embodiment of any of the foregoing embodiments, a temperature of a central core of the at least one inorganic fiber, as a result of the indirect heating of the inorganic material, is lower than the temperature to which the inorganic material is heated.

In a further embodiment of any of the foregoing embodiments, the at least one inorganic fiber is a silicon carbide fiber.

In a further embodiment of any of the foregoing embodiments, the inorganic material is boron nitride.

In a further embodiment of any of the foregoing embodiments, the at least one inorganic fiber is a silicon carbide fiber and the inorganic material is boron nitride.

In a further embodiment of any of the foregoing embodiments, the electromagnetic radiation is microwave radiation.

In a further embodiment of any of the foregoing embodiments, the fiber structure is free of any continuous matrix phase.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example structure for use in a method for controlling a microstructure of an inorganic material.

FIG. 2 illustrates the structure of FIG. 1 after treatment to control the microstructure.

FIG. 3 illustrates another example structure for use in a method for controlling a microstructure of an inorganic material.

FIG. 4 illustrates the structure of FIG. 3 after treatment to control the microstructure.

FIG. 5 illustrates an example fiber structure for use in a method for controlling a microstructure of an inorganic coating on an inorganic fiber.

FIG. 6 illustrates the fiber structure of FIG. 5 after treatment to control the microstructure.

FIG. 7 illustrates another example fiber structure for use in a method for controlling a microstructure of an inorganic coating on an inorganic fiber.

FIG. 8 illustrates the fiber structure of FIG. 7 after treatment to control the microstructure.

FIG. 9 illustrates another example fiber structure for use in a method for controlling a microstructure of an inorganic coating on an inorganic fiber.

FIG. 10 illustrates the fiber structure of FIG. 9 after treatment to control the microstructure.

DETAILED DESCRIPTION

FIG. 1 schematically illustrates a representative portion of a structure 20 for use in a method for controlling a microstructure of an inorganic material. The inorganic material can be a ceramic material, a glass material or a glass-ceramic material, for example. Example inorganic materials can include compositions of oxides, nitrides, carbides, borides, silicides, or combinations thereof, but are not limited to such compositions.

In the illustrated example, the structure 20 includes a first region 22 of an inorganic material having a microstructure 24 and at least one second, adjacent region 26 that is thermally responsive to electromagnetic radiation. The term "microstructure" refers to observable or detectable features of a phase or region of a material. For example, microstructures can differ by crystalline arrangements of atoms, the presence or absence of crystalline phases in the material, the geometry of phases or structures in the material or the like.

The properties of the inorganic material of the first region 22, such as strength, thermal conductivity, etc., depend upon its microstructure 24. For example, the microstructure 24 can be amorphous, fully or substantially fully crystalline or partially amorphous/partially crystalline, and the crystalline phase can be one or more of numerous crystalline polymorphs, all of which can yield different properties.

The initial microstructure 24 of the inorganic material, prior to conducting a method according to this disclosure, can be a result of a processing technique used to form or deposit the inorganic material. For example, the inorganic material can be formed/deposited using chemical vapor deposition, but is not limited to this processing technique.

The microstructure that results from a given processing technique is often not the microstructure that yields the desired or most desired properties for an end-use article. Moreover, there are challenges to forming or depositing an inorganic material with a desired microstructure using a given processing technique and, therefore, further thermal processing, in addition to the processing technique used to form or deposit the inorganic material, is needed to convert the initial microstructure to a desired microstructure.

One technique to thermally convert an initial microstructure to another microstructure is to heat the inorganic material in a furnace. In furnace-heating, convective heating is used to directly heat the inorganic material to a target temperature that is sufficient to convert the initial microstructure. However, if other materials are present with the inorganic material, such as a substrate fiber or composite material, the furnace-heating also heats the other materials, potentially also altering the microstructures of, and debiting the properties of, these other materials. Furnace-heating also requires relatively long heat exposure times to uniformly heat through the bulk of a material, from outside-in, over relatively long thermal conductance distances. Thus, while the conversion of the initial microstructure of the inorganic material may be desired to obtain good properties in the inorganic material, the secondary effects of alteration of the microstructure and properties of the other materials may not be desirable. For this reason, direct heating techniques, such as furnace-heating, are limited in that the further thermal processing temperature/time must be balanced against the detrimental effects on the other materials. As will be described, the method herein provides a technique for indirectly, and rapidly, heating the inorganic material while limiting the heat exposure of other materials that can be undesirably affected.

Turning again to FIG. 1, the second region 26 is thermally activated, using electromagnetic radiation 28, to indirectly heat the inorganic material of the first region 22. In one example, the electromagnetic radiation is microwave radiation, and the intensity and time of the microwave radiation treatment can be varied to achieve a desired thermal response. In some examples, at 100% power, the time can be from 1 second to 5 minutes. Additionally, the treatment can be conducted in a controlled gas environment, such as an environment free or substantially free of oxygen. For example, the controlled gas environment can be a sub-atmospheric pressure environment and/or can include a process gas that is inert with respect to the materials of the regions 22/26, such as argon or nitrogen.

The thermal activation of the second region 26 generates heat that emanates from the second region 26 into the first region 22. The generated heat increases the temperature of the inorganic material of the first region 22 to a conversion temperature or to a temperature within a conversion temperature range, converting the microstructure 24 of the inorganic material to a second, different microstructure 30, represented in FIG. 2.

The second region 26 is more thermally responsive to the electromagnetic radiation than the inorganic material of the first region 22. For example, the second region 26 includes an electromagnetic radiation-responsive material or structure, or portion of a structure, that is thermally responsive to the electromagnetic radiation 28 and is more thermally responsive to the electromagnetic radiation than the inorganic material of the first region 22.

In one example, the inorganic material of the first region 22 is boron nitride, although other inorganic materials will also benefit from this disclosure, and the electromagnetic radiation-responsive material of the second region 26 is silicon carbide, free carbon, or combinations thereof. Boron nitride is less thermally responsive to electromagnetic radiation than silicon carbide and free carbon. Thus, the electromagnetic radiation 28 thermally activates the silicon carbide and free carbon but does not significantly directly heat the boron nitride in the first region 22.

As can be appreciated, the initial microstructure 24 and the resulting converted microstructure 30 will depend upon the composition of the inorganic material of the first region 22 and the conversion temperature to which the inorganic material is heated. In some examples, the initial microstructure 24 is amorphous, fully or substantially fully crystalline, or partially amorphous/partially crystalline, and the resulting microstructure 30 is crystalline or partially amorphous/partially crystalline and can be a different crystalline polymorph than in the initial microstructure 24. For instance, an amorphous microstructure can be converted to a fully or substantially fully crystalline microstructure of higher percent crystallinity, an amorphous microstructure can be converted to a partially crystalline microstructure of higher percent crystallinity, a crystalline microstructure can be converted to a different crystalline microstructure, or a partially crystalline microstructure can be converted to a crystalline microstructure of higher percent crystallinity.

FIG. 3 shows a modified structure 120. In this disclosure, like reference numerals designate like elements where appropriate and reference numerals with the addition of one-hundred or multiples thereof designate modified elements that are understood to incorporate the same features and benefits of the corresponding elements. The structure 120 includes the first region 22 of the inorganic material and at least one second, adjacent region 126 that is thermally responsive to the electromagnetic radiation 28. In this example, the at least one second region 126 includes a plurality of regions of particles 140 dispersed within the inorganic material of the first region 22. The amount of the particles 140 in the first region can be varied to obtain a desired thermal affect. The inorganic material of the first region 22 is indirectly heated by thermally activating the particles 140 of the second regions 126, using the electromagnetic radiation 28. The generated heat increases the temperature of the inorganic material of the first region 22 to a conversion temperature or a temperature within a conversion temperature range, converting the microstructure 24 of the inorganic material to the second, different microstructure 30, represented in FIG. 4.

FIG. 5 shows another example in the context of a cross-section of a fiber structure 220. The fiber structure 220 can be representative of a plurality of fibers, as in a woven or non-woven fiber structure, for example. The fiber structure 220 includes an inorganic fiber 226a having a coating 222 thereon. The coating 222 includes an inorganic material having a first microstructure 224.

In this example, the inorganic fiber 226a includes a surface region 226 and a central core region 226b. The surface region 226 is thermally responsive to the electromagnetic radiation 28. The generated heat increases the temperature of the inorganic material of the coating 222 to a conversion temperature or a temperature within a conversion temperature range, converting the microstructure 224 of the inorganic material to the second, different microstructure 230, represented in FIG. 6.

In this example, the surface region 226 of the inorganic fiber 226a is more thermally responsive than the central core region 226b because of atomic disorder at the free surface (fiber surface) of the surface region 226. Thus, the inorganic fiber 226a heats from outside-in, and the temperature in the central core region 226b, as a result of the indirect heating, remains lower than the temperature to which the inorganic material is heated by the surface region 226. This can provide the benefit of limiting the heat exposure of the inorganic fiber 226a to preserve the microstructure of the inorganic fiber 226a. Moreover, if the application of the electromagnetic radiation 28 is conducted prior to matrix formation around the fiber structure 220, the microstructure 230 can also be obtained without altering the microstructure of the matrix.

In one example, the inorganic material of the coating 222 is boron nitride and the inorganic fiber 226a is a silicon carbide fiber. For example, the boron nitride is to be an interface coating on the inorganic fiber 226a in fiber-reinforced ceramic matrix composite. The boron nitride provides a relatively weak interface between the matrix and the fiber. The de-bonding properties of the boron nitride control, at least in part, the mechanical properties of the composite. Thus, the ability to alter the microstructure 224 of the boron nitride enables tailoring of the de-bonding properties and effective composite design.

The boron nitride of the coating 222 can be deposited onto the inorganic fiber 226a at relatively low deposition temperatures to obtain good coating uniformity. Relatively lower deposition temperatures also yield amorphous boron nitride or boron nitride with low crystallinity. Higher crystallinity is desired for better de-bonding properties. Higher deposition temperatures yield higher crystallinity but poor uniformity. Higher deposition temperatures can also undesirably alter the microstructure of the inorganic fiber 226a. Thus, without the method herein, the selection of the deposition temperature of the boron nitride represents a trade-off between maximization of crystallinity of the boron nitride and minimization of alteration of the microstructure of the silicon carbide fibers. If furnace heating is used to alter the boron nitride, the selection of the temperature represents a similar trade-off. Under such a paradigm, improvement in the properties of the boron nitride necessarily comes at the loss of properties of the silicon carbide fiber, and vice versa. With the method herein, however, there can be less limitation on the deposition temperature of the boron nitride because the method can be used to alter the microstructure of the boron nitride while avoiding long heat exposures of the silicon carbide. Thus, the method opens a new design envelope or paradigm that was not previously available.

FIG. 7 shows another fiber structure 320. In this example, similar to the example of FIG. 3, the coating 222 includes at least one second region 326 including a plurality of regions of particles 340 dispersed within the inorganic material of the coating 222. The inorganic material of the coating 222 is indirectly heated by thermally activating at least the particles 340, using the electromagnetic radiation 28. The electromagnetic radiation 28 also thermally activates the surface region 226 of the inorganic fiber 226a. The generated heat increases the temperature of the inorganic material of the coating 222 to a conversion temperature or a temperature within a conversion temperature range, converting the microstructure 224 of the inorganic material to the second, different microstructure 230, represented in FIG. 8. In this example, the distributed particles 340 thus heat the coating 222 from within and the surface region 226 heats the coating 222 from the inside, to rapidly and uniformly heat the coating 222.

FIG. 9 shows another fiber structure 420 that is similar to the fiber structure of FIG. 5 but includes an over-coating 426 around the coating 222. The coating 426 can be a silicon carbide coating, a free carbon coating or a combination thereof. The coating 426 is thermally responsive to the electromagnetic radiation 28. The electromagnetic radiation 28 also thermally activates the surface region 226 of the inorganic fiber 226a. The generated heat increases the temperature of the inorganic material of the coating 222 to a conversion temperature or a temperature within a conversion temperature range, converting the microstructure 224 of the inorganic material to the second, different microstructure 230, represented in FIG. 10. In this example, the coating 426 heats the coating 222 from the outside and the surface region 226 heats the coating 222 from the inside, to rapidly and uniformly heat the coating 222. As can be appreciated, the coating 222 could also include the particles 340, as in the fiber structure 320 of FIG. 7.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for controlling a microstructure of an inorganic coating on an inorganic fiber, the method comprising:
   providing a fiber structure including at least one inorganic fiber having a coating thereon, the coating including an inorganic material having a first microstructure; and
   indirectly heating the inorganic material, using electromagnetic radiation, to convert the first microstructure to a second, different microstructure with regard to crystalline arrangements of atoms between the first and second microstructures or the presence or absence of crystalline phases between the first and second microstructures.

2. The method as recited in claim 1, including using the electromagnetic radiation to heat at least one region adjacent the inorganic material, the at least one region being thermally responsive to the electromagnetic radiation.

3. The method as recited in claim 2, wherein the at least one region is a surface region of the at least one inorganic fiber.

4. The method as recited in claim 2, wherein the at least one region is another coating on the coating.

5. The method as recited in claim 2, wherein the at least one region includes a plurality of regions of particles dispersed within the inorganic material.

6. The method as recited in claim 1, wherein a temperature of a central core of the at least one inorganic fiber, as a result of the indirect heating of the inorganic material, is lower than the temperature to which the inorganic material is heated.

7. The method as recited in claim 1, wherein the at least one inorganic fiber is a silicon carbide fiber and the inorganic material is boron nitride.

8. The method as recited in claim 1, wherein the electromagnetic radiation is microwave radiation.

9. The method as recited in claim 1, wherein the fiber structure is free of any continuous matrix phase.

10. The method as recited in claim 1, wherein the electromagnetic radiation is microwave radiation, and the first microstructure and the second microstructure are different crystalline polymorphs.

* * * * *